US011063388B2

(12) United States Patent
Forstmeier et al.

(10) Patent No.: US 11,063,388 B2
(45) Date of Patent: Jul. 13, 2021

(54) METHOD FOR SEALING A JOINING REGION OF AN ELECTRICAL CONNECTION ASSEMBLY, AND ELECTRICAL CONNECTION ASSEMBLY

(71) Applicant: Lisa Dräxlmaier GmbH, Vilsbiburg (DE)

(72) Inventors: Christoph Forstmeier, Landshut (DE); Lutz Lehmann, Vilsbiburg (DE); Felix Klimas, Langquaid (DE)

(73) Assignee: Lisa Dräxlmaier GmbH, Vilsiburg (DE)

( * ) Notice: Subject to any disclaimer, the term of this patent is extended or adjusted under 35 U.S.C. 154(b) by 0 days.

(21) Appl. No.: 16/616,616

(22) PCT Filed: Jun. 20, 2018

(86) PCT No.: PCT/EP2018/066434
§ 371 (c)(1),
(2) Date: Nov. 25, 2019

(87) PCT Pub. No.: WO2018/234385
PCT Pub. Date: Dec. 27, 2018

(65) Prior Publication Data
US 2020/0185856 A1     Jun. 11, 2020

(30) Foreign Application Priority Data
Jun. 22, 2017   (DE) .................... 10 2017 113 837.4

(51) Int. Cl.
*H01R 13/52*     (2006.01)
*B23K 20/12*     (2006.01)
(Continued)

(52) U.S. Cl.
CPC ....... *H01R 13/5216* (2013.01); *B23K 20/129* (2013.01); *H01R 4/04* (2013.01);
(Continued)

(58) Field of Classification Search
CPC ...... H01R 12/5216; H01R 4/04; H01R 4/625; H01R 11/12; H01R 43/02; B23K 20/129
(Continued)

(56) References Cited

U.S. PATENT DOCUMENTS 2,815,497 A * 12/1957 Redslob .................. H01R 4/62
439/203
3,243,758 A * 3/1966 Frant ....................... H01R 4/18
439/519

(Continued)

FOREIGN PATENT DOCUMENTS

DE            101 58 698 A1     6/2003
DE     10 2010 005 894 A1      7/2011
(Continued)

OTHER PUBLICATIONS

International Search Report for corresponding Application No. PCT/EP2018/066434 dated Sep. 17, 2018 (18 pages).
(Continued)

*Primary Examiner* — Peter G Leigh
(74) *Attorney, Agent, or Firm* — BelayIP

(57) ABSTRACT

A method may be provided for sealing a joining region of an electrical connection assembly, the assembly comprising a cable having a plurality of individual conductors, which are arranged in a holding sleeve of an electrical connection element and which are welded to an end section of the holding sleeve in the joining region, which is formed as a recess. The joining region may be sealed by means of a plug inserted into the joining region at an end face and in an interlocking manner, wherein the plug is adapted to a shape of a friction welding tool, by means of which the individual conductors and the end section of the holding sleeve have previously been welded to each other by friction welding. An electrical connection assembly may also be provided.

18 Claims, 3 Drawing Sheets

(51) Int. Cl.
*H01R 4/04* (2006.01)
*H01R 4/62* (2006.01)
*H01R 11/12* (2006.01)
*H01R 43/02* (2006.01)

(52) U.S. Cl.
CPC ............ *H01R 4/625* (2013.01); *H01R 11/12* (2013.01); *H01R 43/02* (2013.01)

(58) Field of Classification Search
USPC ........................................................ 439/587
See application file for complete search history.

(56) References Cited

U.S. PATENT DOCUMENTS

| | | | | |
|---|---|---|---|---|
| 3,656,092 | A * | 4/1972 | Swengel, Sr. .......... | H01R 4/029 439/730 |
| 5,418,331 | A * | 5/1995 | Delalle .................... | H01R 4/22 174/74 R |
| 5,749,756 | A * | 5/1998 | Vockroth ................ | H01R 4/203 174/84 C |
| 6,538,203 | B1 * | 3/2003 | Nolle ....................... | H01R 4/62 174/84 C |
| 7,048,562 | B2 * | 5/2006 | Lutsch .................... | H01R 4/20 439/275 |
| 7,174,633 | B2 * | 2/2007 | Onuma .................... | H01R 4/04 29/854 |
| 7,597,596 | B2 * | 10/2009 | Watanabe ............... | H01R 4/183 439/877 |
| 7,985,104 | B2 * | 7/2011 | Jager ...................... | H01R 4/023 439/748 |
| 8,771,015 | B2 * | 7/2014 | Inoue ...................... | H01R 4/70 439/604 |
| 8,840,437 | B2 * | 9/2014 | Hentschel .............. | H01R 4/029 439/874 |
| 8,951,063 | B2 * | 2/2015 | Iio .......................... | H01R 4/185 439/523 |
| 9,083,100 | B2 * | 7/2015 | Uno ........................ | H01R 43/24 |
| 9,225,076 | B2 * | 12/2015 | Froeschl ................ | H01R 4/023 |
| 9,252,527 | B2 * | 2/2016 | Aizawa .................... | H01R 4/18 |
| 9,293,838 | B2 * | 3/2016 | Sakaguchi ............... | H01R 4/62 |
| 9,525,215 | B2 * | 12/2016 | Kawamura .......... | H01R 43/048 |
| 9,543,689 | B2 * | 1/2017 | Sato ........................ | H01R 4/188 |
| 9,564,690 | B2 * | 2/2017 | Kondo .................... | H01R 4/70 |
| 9,608,339 | B2 * | 3/2017 | Ito ........................... | H01R 4/62 |
| 9,647,348 | B2 * | 5/2017 | Trafton .................. | H01R 4/625 |
| 9,991,608 | B2 * | 6/2018 | Trafton .................. | H01R 4/184 |
| 2006/0292922 | A1 * | 12/2006 | Froschl .................. | H01R 4/625 439/442 |
| 2012/0324727 | A1 * | 12/2012 | Seifert .................. | H01R 43/048 29/867 |
| 2013/0126234 | A1 * | 5/2013 | Ono ........................ | H02G 15/08 174/75 R |
| 2013/0210255 | A1 * | 8/2013 | Uchiyama .............. | H01R 13/04 439/271 |
| 2013/0344752 | A1 * | 12/2013 | Takayama ................ | H01R 4/70 439/877 |
| 2014/0335741 | A1 * | 11/2014 | Uno ......................... | H01R 4/70 439/736 |
| 2015/0140202 | A1 * | 5/2015 | Sato ..................... | H01R 43/005 427/58 |
| 2015/0287496 | A1 * | 10/2015 | Sato ........................ | H01R 4/70 174/74 R |
| 2016/0006138 | A1 | 1/2016 | Harms et al. | |
| 2016/0344115 | A1 * | 11/2016 | Miyakawa ............. | H01R 13/52 |
| 2017/0331202 | A1 * | 11/2017 | Aoki ...................... | H01R 4/185 |

FOREIGN PATENT DOCUMENTS

| | | |
|---|---|---|
| DE | 20 2012 008242 U1 | 11/2012 |
| DE | 10 2013 013151 A1 | 2/2013 |
| DE | 10 2013 101876 B3 | 6/2014 |
| JP | 2011 108437 A | 6/2011 |

OTHER PUBLICATIONS

Office Action in corresponding German Patent Application No. 10 2017 113 837.4 dated Oct. 26, 2017 (8 pages).
Office Action in corresponding German Patent Application No. 10 2017 107 410.4 dated Dec. 13, 2017 (8 pages).

* cited by examiner

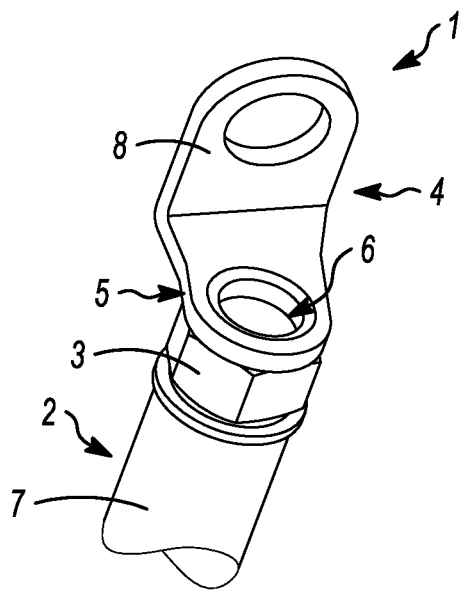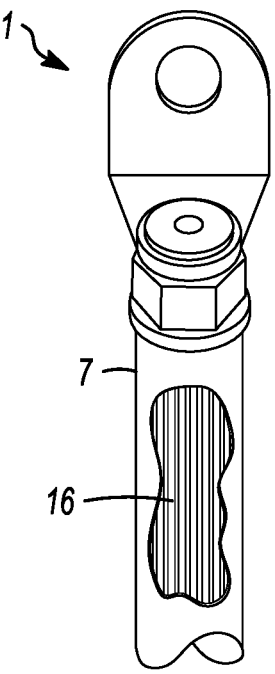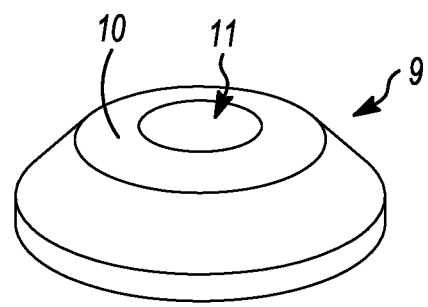

METHOD FOR SEALING A JOINING REGION OF AN ELECTRICAL CONNECTION ASSEMBLY, AND ELECTRICAL CONNECTION ASSEMBLY

CROSS REFERENCE TO RELATED APPLICATIONS

This application is a national phase application of International Application No. PCT/EP2018/066434, filed Jun. 20, 2018, and claims the priority benefit of German Application No. 10 2017 113 837.4, filed Jun. 22, 2017, the content of both of which is incorporated herein by reference.

TECHNICAL FIELD

The disclosure relates to a method for sealing a joining region of an electrical connection assembly as well as to an electrical connection assembly.

BACKGROUND

DE 10 2013 101 876 B3 shows an electrical connection assembly which has a cable with a plurality of individual conductors, which are welded to an end section of a holding sleeve in a joining region that is embodied as a recess. The joining region is attained by introducing a mandrel into a bundle of conductors of the cable, whereby individual conductors in the vicinity of the end section of the holding sleeve are forced outward in the direction of the holding sleeve. In a resultant engagement indentation, the mandrel is used as a rotary friction welding element for a friction welding procedure, whereby the joining region embodied as a recess is produced. Alternatively, the mandrel can also be a tool for some other friction welding procedure, for instance in the form of a sonotrode for torsional ultrasound welding.

Joining regions of this kind, e.g., embodied as a recess, typically have materials of differing electronegativity, since the individual conductors of cables of this kind are typically of nonferrous heavy metal, and the holding sleeve is often of light metal. This kind of joining region should be protected against electrolytes, especially saltwater or the like, in order to avoid electrocorrosion. However, reliably sealing off such joining regions from the incursion of electrolytes is difficult to achieve. Coating such a joining region has the disadvantage that the coating is not permanently elastic. Furthermore, during the coating procedure, so-called weather grooves can develop. In addition, walls that are vertical or especially steep in the joining region can be sealed only with difficulty. The coating thicknesses can moreover be inconsistent. It would also be possible to use a kind of potting compound for sealing. However, the materials then used are typically relatively expensive and have relatively long curing times. It would moreover also be possible, for instance, to surround such joining regions with a housing. In that case, though, a relatively large amount of space is required, assembling the housing is relatively complicated, and such housings can also entail relatively high costs.

From DE 101 58 698 A1, a method for producing a multi-part plastic body is furthermore known in which a first partial body is partially heated and put into contact with a further partial body, and the residual heat combines the two partial bodies into a single plastic body in a chemical process.

Finally, from DE 10 2010 005 894 A1, a method for thermal joining of workpieces is known, in which after the thermal joining, a coating is reapplied by thermal application of coating material.

SUMMARY

In view of limitations in the related art, an object of certain embodiments of the disclosure may be to furnish a way with which a joining region formed as a recess in an electrical connection assembly can be sealed especially simply and reliably.

The above and other objects may be attained by implementations consistent with the independent claims. Advantageous embodiments with expedient and non-trivial refinements of the disclosure may be recited in the dependent claims. Objects and advantages of the disclosed embodiments may be realized and attained by the elements and combinations set forth in the claims. However, embodiments of the present disclosure are not necessarily required to achieve such exemplary objects and advantages, and some embodiments may not achieve any of the stated objects and advantages.

In a method for sealing a joining region of an electrical connection assembly that includes a cable with a plurality of individual conductors arranged in a holding sleeve of an electrical connection element, wherein the conductors are welded by an end section of the holding sleeve in the joining region that is formed as a recess, the joining region may be sealed off by means of a plug inserted in an interlocking manner into an end face of the joining region, the plug being adapted to a shape of a friction welding element by means of which the individual conductors and the end section of the holding sleeve are welded to one another beforehand by friction welding.

It is therefore provided, according to some aspects of the disclosure, that the shape of the plug is adapted to the shape of the joining region that may be formed as a recess. This is attained in that the shape of the plug is at least essentially equivalent to the shape of the friction welding element employed, and therefore the shape of the plug is also necessarily equivalent to the shape or contour of the resultant joining region. For instance, if a conical friction welding element is employed for producing the joining region, then a truncated conical plug, for instance, can be used, provided that a plane surface is to be formed as the joining region cools. By means of a method according to some embodiments of the disclosure, it is possible for joining regions produced by friction welding elements and embodied as a recess to be protected especially simply against the incursion of electrolytes, and in particular of saltwater or the like. The joining region can for instance be produced by friction stir welding or by ultrasonic welding. The joining region can for instance be formed in a bowl-like shape or in other arbitrary shapes embodied essentially as a recess. The shaping of the joining region may depend upon the shape of the welded-in friction welding element that is used to produce the welded connection in the joining region.

Accordingly, some aspects of the disclosure may make use of the fact that the joining region is geometrically defined, and there is a high surface quality because of the friction welding procedure. The plug acting as a sealing element is optimally tailored to these given conditions. In particular by means of the adapted geometry of the plug, the sealing procedure per se, that is, the sealing on the end face and conforming in shape, of the joining region by means of the plug, takes place especially quickly. The plug may conform to the shape of the joining region, for example, the end face. By means of the method in accordance with some aspects of the disclosure, it is thus possible, reliably and simply, by means of the plug on the end face and with a conforming shape, for joining regions to be sealed off against the incursion of electrolytes, such as saltwater or the like. Despite the varying material composition of the joining region, including light metals and nonferrous heavy metals, the occurrence of electrocorrosion can thereby be reliably averted for long periods of time.

In some embodiments, the plug is inserted into the joining region within a predetermined time period after friction welding. The time period may be such that the insertion occurs so soon after the friction welding that the process heat introduced into the joining region by means of the friction welding element suffices to at least partially melt the plug and thereby seal the joining region by means of the plug. In particular, using the process heat reduces the stress on an insulating material for the cable to a minimum. Furthermore, because of the adapted geometry of the plug to the shape of the joining region, not nearly as much heat energy is necessary, since for reliable sealing it can already be sufficient if merely the peripheral regions of the plug facing toward the joining region are melted as a result of the remaining process heat. Since the process heat occurs anyway in the friction welding procedure, it can additionally be used for melting the plug and thus for sealing the joining region.

In conjunction with the use of the process heat occurring in the friction welding for melting the plug, it is advantageously provided that a conduit is introduced into the plug that connects an opening located on a top side with an opening located on an underside of the plug. The plug provided with the conduit is inserted into the joining region with its underside oriented toward the joining region. The conduit can for instance be drilled into the plug or produced in some other way. In other words, the conduit thus provides a passageway connecting the top side and underside of the plug with one another. During the insertion or pressing in of the plug into the joining region, the occurrence of air inclusions between the plug and the joining region can thus be prevented. When the plug is being inserted into the joining region, any air present between the underside of the plug and the joining region can escape easily through the conduit. As a result, especially reliable sealing of the joining region can be ensured.

In some embodiments, the plug, in the vicinity of its underside, has a different color from that in the vicinity of its top side, so that when the plug melts, molten material from the underside escapes first through the conduit to the opening of the upper side. Because of the different coloring of the underside and top side, it can therefore especially easily be monitored whether a successful sealing procedure has been achieved. The molten material of the underside, which has a different color from the top side, can be recognized quite simply as it exits in the molten state from the opening in the top side. As a result, in a simple way, destruction-free and reliable checking of the reliable sealing effect of the plug becomes possible. This can be recognized especially simply if the plug, in the vicinity of its underside, is made from a colored material and in the vicinity of its top side is made from a transparent material.

In some embodiments, it is provided that the plug is press-fitted into the joining region so that as a result, the joining region is sealed off by means of the plug without melting the plug. The advantage in this kind of procedure is that introducing the plug need not directly follow the friction welding procedure. For instance, the plug can be inserted into the joining region in a different workstation or even in a different factory, without having to pay particular notice to a time lapse between the friction welding procedure and the insertion of the plug. Because the plug is press-fitted into the joining region, it is also possible for the joining region to be sealed off reliably and in an interlocking manner on an end face. In this regard, however, it is also possible for the plug to be press-fitted into the joining region for instance by means of the friction welding element, by means of which the friction welded connection between the holding sleeve and the individual conductors of the cable in the joining region has been established beforehand. However, if the insertion of the plug and the friction welding procedure are done at different locations, then an arbitrary number of other tools can be employed for press-fitting the plug.

In some embodiments, the plug is made from a thermoplastic material. In some embodiments, the plug is made from a permanent elastic material. The permanent elasticity ensures that the sealing element can compensate for thermally induced changes of shape of the electrical connection element and thus no gaps occur. A permanent elastic material may be durable, and the elastic properties of a permanent elastic material may be lasting.

In particular if the plug is to be melted, it is advantageous if it has been made from thermoplastic material. The permanent elastic properties of the plug are advantageous both in press-fitting it in and in the utilization of process heat, in order to ensure a permanently reliable seal of the joining region against the entry of electrolytes.

In some embodiments of the disclosure, the plug may be provided, in at least one region, with an adhesive, which is oriented toward the joining region when the plug is inserted. As a result, the plug can for instance be preliminarily positioned and fixed relatively simply in the joining region. In particular if the plug is press-fitted into the joining region without melting, providing the adhesive can contribute to the exactness in ultimate positioning of the plug while it is being press-fitted into the joining region.

The electrical connection assembly includes a cable having a plurality of individual conductors, arranged in a holding sleeve of an electrical connection element. The conductors are welded to an end section of the holding sleeves in a joining region that may be formed as a recess. The electrical connection assembly may have a joining region that is sealed off by means of a plug inserted into it on an end of the joining region and in form-fitting fashion. Advantageous features of methods consistent with the disclosure may also be considered as advantageous embodiments of electrical connection assemblies consistent with the disclosure, and vice versa. This preferably, in the case of the electrical connection element, involves a cable shoe with a connection eyelet. Other electrical connection elements, however, are also possible.

BRIEF DESCRIPTION OF THE DRAWINGS

Further advantages, features and details of the invention will become apparent from the ensuing description of a preferred exemplary embodiment and with the aid of the drawing. The features and combinations of features recited below in the description, as well as the features and feature combinations shown after that in the drawing description or in the drawings alone, can be used not only in the particular combination recited, but also in other combinations or on their own, without departing from the scope of the invention.

FIG. 1A and FIG. 1B are perspective views of an electrical connection assembly, which includes a cable with a plurality of individual conductors arranged in a holding sleeve of a cable shoe, wherein the cable is welded on to an end section of the holding sleeve in a joining region embodied as a recess.

FIG. 2 illustrates a frustoconical plug, which acts as a sealing element for the joining region.

In the drawings, identical or functionally identical elements are provided with the same reference numerals.

DETAILED DESCRIPTION

Figure 3:
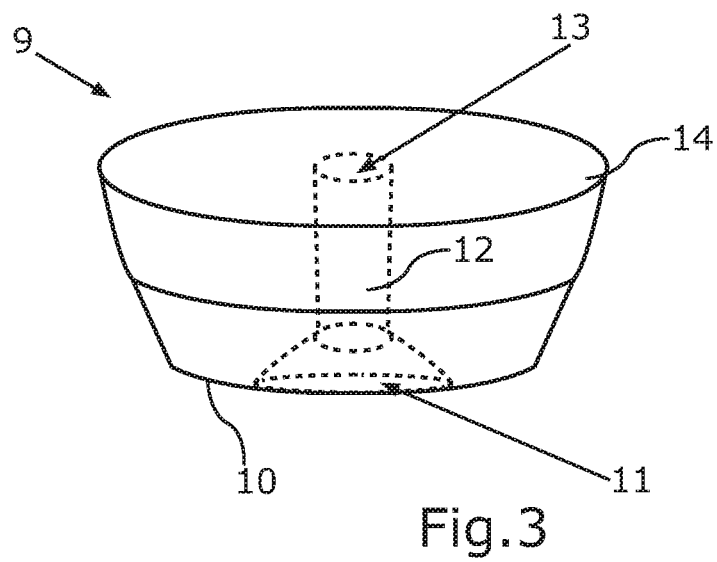
FIG. 3 is a partly transparent and schematic perspective view of the plug, in which a conduit extending through the plug is shown.

As used throughout the present disclosure, unless specifically stated otherwise, the term "or" encompasses all possible combinations, except where infeasible. For example, the expression "A or B" shall mean A alone, B alone, or A and B together. If it is stated that a component includes "A, B, or C," then, unless specifically stated otherwise or infeasible, the component may include A, or B, or C, or A and B, or A and C, or B and C, or A and B and C. Expressions such as "at least one of" do not necessarily modify an entirety of a following list and do not necessarily modify each member of the list, such that "at least one of A, B, and C" should be understood as including only one of A, only one of B, only one of C, or any combination of A, B, and C.

An electrical connection assembly 1 is shown in a perspective view in FIGS. 1A and 1B. The electrical connection assembly 1 includes a cable 2 with a plurality of individual conductors 16 located in a holding sleeve 3 of a cable shoe 4. The individual conductors are welded to an end section 5 of the holding sleeve 3 in a joining region 6 that is formed as a recess. This kind of electrical connection assembly 1 can be produced using the patent DE 10 2013 101 876 B3 named in the background section.

The cable 2 further includes an insulation 7, which extends as far as the holding sleeve 3. Individual conductors 16 may be arranged inside the cable 2. The cable shoe 4 in the embodiment shown here of the electrical connection assembly 1 also has an eyelet 8, which can be used to connect the electrical connection assembly 1 onto other electrical conductors, such as a bus bar, or other electrical conductors.

The connection sleeve 3 is preferably made from a light metal, and the individual conductors 16, sheathed by the insulation 7 of the cable 2, are preferably made from nonferrous metal, such as copper or the like. As a result, the problem arises in the joining region 6 that materials of different electronegativity are present, which promotes the occurrence of electro corrosion. It is therefore especially important to protect this joining region 6 embodied as a recess against the entry of electrolytes, in particular saltwater or the like.

In FIG. 2, a plug 9 is shown in a perspective view. The plug 9 may serve as a sealing element for the joining region 6 of the electrical connection assembly 1. The joining region 6 may be formed as a recess. The plug 9 may be deformed so as to seal off the joining region 6. Sealing off the joining region 6 may include isolating conductors of the cable 2 from an exterior of the joining region 6. An opening 11 can be seen in an underside 10 of the plug 9. This opening 11 on the underside 10 of the plug 9 favors a procedure of sealing the joining region 6, which will be addressed in further detail in conjunction with the following drawings. Preferably, the plug 9 is made from a thermoplastic and permanently elastic material.

In FIG. 3, the plug 9 is shown in a partly transparent, schematic perspective view. In the present illustration, the opening 11 can again be seen on the underside 10 of the plug 9. It can also be seen that a conduit 12 extends through the interior of the plug 9. The conduit 12 connects the opening 11 on the underside 10 of the plug 9 with the opening 13 in an upper side 14 of the plug 9.

Figure 4:
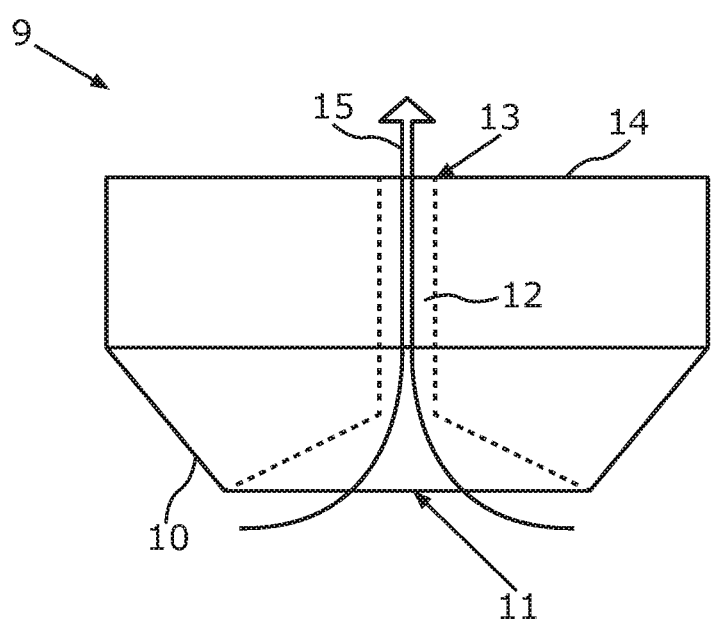
FIG. 4 is a schematic lateral side sectional view, in which it is shown how molten material of the plug escapes to the outside through the conduit.

In FIG. 4, the plug 9 is shown in a schematic lateral sectional view. For sealing off the joining region 6 embodied as a recess, the plug 9 is inserted into the joining region 6 so soon after a friction welding procedure, by means of which the joining region 6 has been produced, that the process heat introduced into the joining region 6 by means of a friction welding element employed for friction welding suffices to melt the plug 9 at least partially and thereby seal off the joining region 6 by means of the plug 9. The conduit 12 ensures that that trapped air can escape between the underside 10 and the joining region 6. Any trapped air can very simply pass through the opening 11 into the conduit 12 and escape through the opening 13 on the upper side 14.

Additionally, it can also be provided that at least the underside 10 has a different color from the upper side 14 of the plug 9. Thus if the plug 9 melts, then molten mass 15 originating at the underside 10 can rise through the conduit 12 and exit through the opening 13. Because of the different coloring of the upper side 14 and underside 10, it can very easily be recognized visually whether a successful sealing procedure by means of the plug 9 has been achieved, since the plug will have been melted on its underside 10.

The plug 9 is preferably adapted, because of its shaping, to the shape of the joining region 6 embodied as a recess. For instance, if the joining region 6 is produced by friction stir welding, then the shaping of the plug 9 can at least essentially be equivalent to that of a friction welding element. A surface of the friction welding element may form an end face of the joining region 6. The friction welding element may be a part of a tool used for friction stir welding. By means of the adapted geometry of the plug 9 acting as a sealing element, only a relatively thin peripheral layer of the plug 9 has to be melted in order to achieve a reliable sealing effect.

Figure 5:
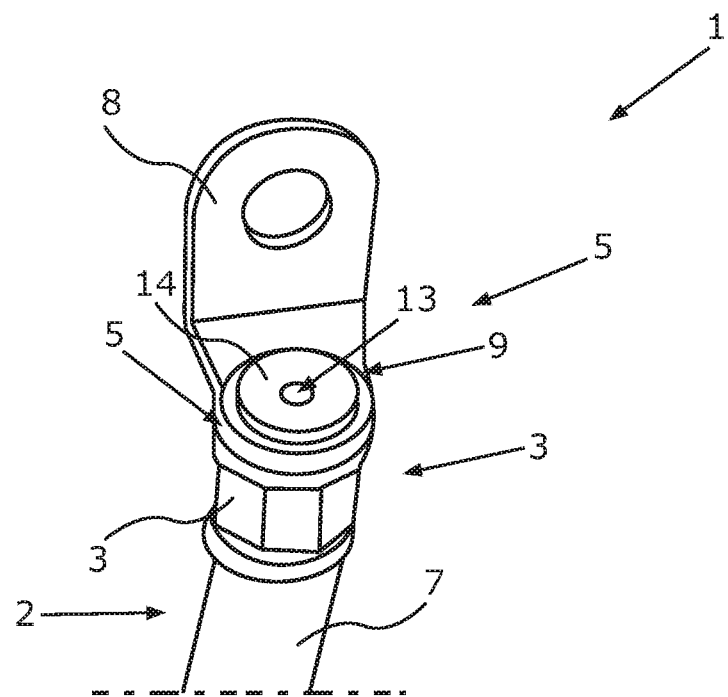
FIG. 5 is a further perspective view of the electrical connection assembly, in which the plug has been inserted into an end face of the joining region.

In FIG. 5, the electrical connection assembly 1 is shown in a further perspective view, in which the plug 9 has been inserted on an end face into the joining region 6 embodied as a recess. As already explained above, this is preferably done so soon after the friction welding procedure, by which the individual conductors of the cable 2 have been welded to the end section 5 of the holding sleeve 3, that the process heat introduced into the joining region 6 during the friction welding procedure suffices to melt the plug 9 to such an extent that it reliably seals off the joining region 6.

In addition, it is also possible for the plug 9, in the region which faces toward the joining region 6, to be provided with an adhesive. As a result, it can be ensured that the plug 9, once inserted into the joining region 6, also stays in place there.

Figure 6:
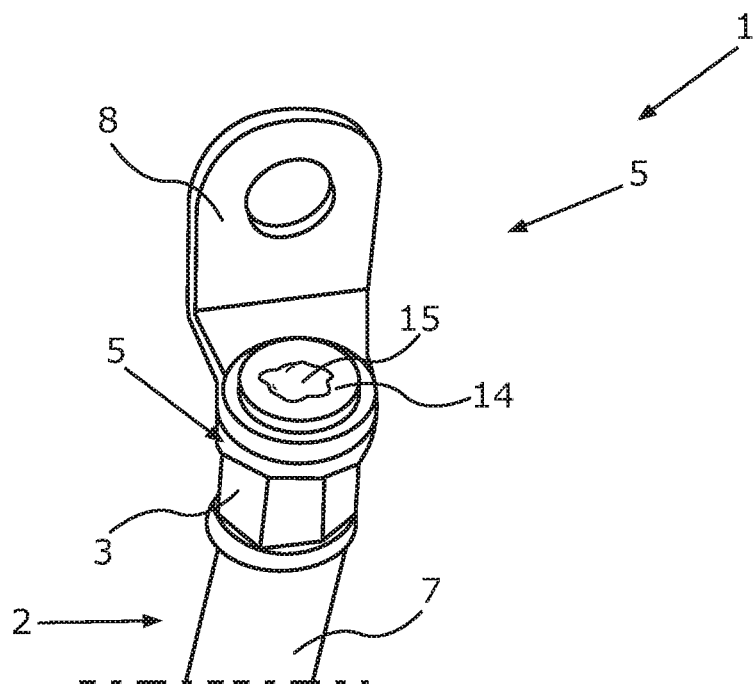
FIG. 6 is a further perspective view of the electrical connection assembly is shown, in which the plug inserted into the joining region has been partially melted, as a consequence of which it seals the joining region on the end face and in form-fitting fashion.

In FIG. 6, the electrical connection assembly 1 is shown in a further perspective view, in which the plug 9, inserted into the joining region 6 on an end face thereof, has been at least partially melted because of the process heat introduced into the joining region 6 by the friction welding. This can be seen by the fact that the hole 13 on the upper side 14, as seen in FIG. 5, is no longer visible. This is because the molten mass 15, created by the melting of the plug 9 has passed through the hole 13.

From the present illustration one can once again readily see that if there is a different coloring of the upper side 14 and the underside 10 of the plug 9, or of the entire region of the plug 9 that is to be melted, it can be quite easily seen visually if the plug 9 has melted sufficiently to seal off the joining region 6 reliably against the entry of electrolytes.

In particular if the process heat introduced in the friction welding procedure is used to melt the plug 9, the insulation 7 of the cable 2 can be protected relatively well. This is because in that case, no additional heat need be introduced in order to melt the plug 9 for the sake of sealing off the joining region 6.

However, it is also possible for the plug 9 to be used without being melted, in order to seal off the joining region 6. In that case, the plug 9 can for instance be press-fitted into the joining region 6, so that the joining region 6, by means of the plug 9, can also be sealed off without melting the plug. This is especially advantageous if, because of certain peripheral conditions, it proves more advantageous that sealing off of the joining region 6 by means of the plug 9 be carried out in a separate location from where the actual friction welding procedure took place. By press-fitting the plug 9 without melting it, it is also possible to achieve a sufficient sealing effect. To ensure the sealing effect, it can additionally be provided in particular in this context that the plug 9 be provided with an adhesive in the region in which it is put in contact with the joining region 6.

Having described some aspects of the present disclosure in detail, it will be apparent that further modifications and variations are possible without departing from the scope of the disclosure. All matter contained in the above description and shown in the accompanying drawings shall be interpreted as illustrative and not in a limiting sense.

The invention claimed is:

1. A method for sealing a joining region of an electrical connection assembly that includes a cable having a plurality of individual conductors arranged in a holding sleeve of an electrical connection element, the method comprising:
   attaching the conductors to an end section of the holding sleeve in the joining region, wherein the joining region is formed as a recess;
   inserting a plug into an end face of the joining region in an interlocking manner, wherein the plug is adapted to a shape of the end face; and
   wherein the plug is formed of at least one of a thermoplastic material or a permanently elastic material.

2. The method of claim 1, further comprising:
   welding the conductors to the end section by a friction welding element, wherein the plug is adapted to a shape of the friction welding element.

3. The method of claim 2, wherein the friction welding element forms a part of the joining region.

4. The method of claim 2, wherein
   the plug is inserted into the joining region within a time period after friction welding such that process heat introduced into the joining region by the friction welding element at least partially melts the plug and thereby seals off the joining region by the plug.

5. The method of claim 1, wherein
   the plug includes a conduit that connects an opening in an upper side of the plug to an opening in an underside of the plug, and the plug is inserted into the joining region with its underside oriented toward the joining region such that molten material in enabled to flow through the conduit.

6. The method of claim 5, wherein
   the plug has a different color at the underside from that at the upper side, so that when the plug melts, molten material having a color different from that of the upper side of the plug flows out of the opening in the upper side from the region of the underside through the conduit.

7. The method of claim 6, wherein
   the plug includes a portion in a vicinity of the underside manufactured from a colored material and a portion in a vicinity of the upper side manufactured from a transparent material.

8. The method of claim 1, further comprising:
   press-fitting the plug into the joining region so that the joining region is sealed off by the plug without melting the plug.

9. The method of claim 8, wherein the plug is press-fitted into the joining region by a friction welding element.

10. The method of claim 1, wherein
    the plug is provided with an adhesive, and
    the plug is inserted into the joining region with the adhesive oriented toward the joining region.

11. An electrical connection assembly, including a cable having a plurality of individual conductors arranged in a holding sleeve of an electrical connection element, the conductors welded to an end section of the holding sleeve in a joining region that is formed as a recess,
    wherein a plug inserted into the joining region at an end face thereof and in an interlocking manner seals off the joining region.

12. The electrical connection assembly of claim 11, wherein the electrical connection element is a cable shoe having a connection eyelet.

13. A method for sealing a joining region of an electrical connection assembly, the joining region including a recess, the method comprising:
    attaching conductors of a cable arranged in a holding sleeve of the electrical connection element to an end section of the holding sleeve in the joining region;
    attaching a plug to an end face of the joining region so as to seal off the joining region, wherein the plug is adapted to a shape of the end face; and
    wherein the plug is formed of at least one of a thermoplastic material or a permanently elastic material.

14. The method of claim 13, wherein the joining region includes a friction welding element, and the end face includes a surface of the friction welding element.

15. The method of claim 13, further comprising:
    deforming the plug to adapt the plug to a shape of the joining region.

16. The method of claim 15, wherein the deforming includes melting the plug.

17. The method of claim 15, wherein the deforming includes press-fitting the plug.

18. The method of claim 13, further comprising:

flowing molten material from an underside of the plug through a conduit in the plug to an upper side of the plug.

* * * * *